United States Patent
Liu et al.

(10) Patent No.: US 9,471,495 B2
(45) Date of Patent: Oct. 18, 2016

(54) METHOD AND APPARATUS FOR CONSTRUCTING MEMORY ACCESS MODEL

(71) Applicant: Huawei Technologies Co., Ltd., Shenzhen, Guangdong (CN)

(72) Inventors: Yiyang Liu, Shenzhen (CN); Wei Wang, Hangzhou (CN); Xishi Qiu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 14/263,212

(22) Filed: Apr. 28, 2014

(65) Prior Publication Data

US 2014/0237192 A1    Aug. 21, 2014

Related U.S. Application Data

(63) Continuation of application No. PCT/CN2011/081544, filed on Oct. 31, 2011.

(51) Int. Cl.
*G06F 12/08* (2016.01)
*G06F 11/34* (2006.01)
(Continued)

(52) U.S. Cl.
CPC ....... *G06F 12/0833* (2013.01); *G06F 11/3419* (2013.01); *G06F 11/3447* (2013.01); *G06F 11/3466* (2013.01); *G06F 11/3471* (2013.01); *G06F 12/1009* (2013.01); *G06F 12/121* (2013.01); *G06F 2201/86* (2013.01);
(Continued)

(58) Field of Classification Search
CPC .......... G06F 11/3419; G06F 11/3447; G06F 11/3466; G06F 12/08; G06F 12/12; G06F 11/30; G06F 11/34; G06F 11/3409; G06F 12/0804; G06F 12/0891; G06F 12/0866; G06F 12/0897; G06F 12/0808
See application file for complete search history.

(56) References Cited

U.S. PATENT DOCUMENTS

| | | | | |
|---|---|---|---|---|
| 4,761,733 A | * | 8/1988 | McCrocklin | G06F 9/22 711/203 |
| 4,890,223 A | * | 12/1989 | Cruess | G06F 12/1036 711/164 |
| 5,282,274 A | * | 1/1994 | Liu | G06F 12/1027 711/206 |

(Continued)

FOREIGN PATENT DOCUMENTS

| | | |
|---|---|---|
| CN | 1560746 A | 1/2005 |
| CN | 101136765 A | 3/2008 |

(Continued)

*Primary Examiner* — Jared Rutz
*Assistant Examiner* — Jean Edouard

(57) ABSTRACT

Embodiments of the present invention provide a method and an apparatus for constructing a memory access model, and relate to the field of computers. The method includes: obtaining a page table corresponding to a process referencing a memory block, and clearing a Present bit included in each page table entry stored in the page table; and constructing a memory access model of the memory block according to the number of access times of each page in the memory block and time obtained through timing, where the memory access model at least includes the number of access times and an access frequency of each page in the memory block. The apparatus includes: a first obtaining module, a first monitoring module, a first increasing module, and a second obtaining module. The present invention can reduce the memory consumption and an impact on the system performance, and avoid a system breakdown.

20 Claims, 8 Drawing Sheets

(51) Int. Cl.
*G06F 12/12* (2016.01)
*G06F 12/10* (2016.01)

(52) U.S. Cl.
CPC ..... *G06F2201/865* (2013.01); *G06F 2201/88* (2013.01); *G06F 2212/62* (2013.01)

(56) References Cited

U.S. PATENT DOCUMENTS

| | | | | |
|---|---|---|---|---|
| 6,112,286 | A * | 8/2000 | Schimmel | G06F 12/1018 711/203 |
| 6,157,398 | A * | 12/2000 | Jeddeloh | G06F 12/0284 345/532 |
| 2003/0217144 | A1 * | 11/2003 | Fu | H04L 29/06 709/224 |
| 2003/0217162 | A1 * | 11/2003 | Fu | H04L 29/06 709/229 |
| 2005/0001847 | A1 * | 1/2005 | Jeddeloh | G06F 12/0284 345/532 |
| 2005/0120143 | A1 | 6/2005 | Minagawa et al. | |
| 2006/0101081 | A1 * | 5/2006 | Lin | G06F 17/30362 |
| 2006/0184762 | A1 * | 8/2006 | Cobley | G06F 9/5016 711/170 |
| 2007/0079106 | A1 * | 4/2007 | Davis | G06F 12/1018 711/203 |
| 2008/0140971 | A1 * | 6/2008 | Dankel | G06F 12/0284 711/163 |
| 2008/0183958 | A1 * | 7/2008 | Cheriton | G06F 12/0223 711/108 |
| 2008/0282045 | A1 * | 11/2008 | Biswas | G06F 12/0246 711/159 |
| 2009/0119466 | A1 | 5/2009 | Gower et al. | |
| 2009/0210649 | A1 * | 8/2009 | Wan | G06F 9/30087 711/170 |
| 2010/0235586 | A1 * | 9/2010 | Gonion | G06F 12/0831 711/144 |
| 2010/0250870 | A1 * | 9/2010 | Vick | G06F 12/1027 711/154 |
| 2011/0016290 | A1 * | 1/2011 | Chobotaro | G06F 9/45558 711/207 |
| 2011/0087840 | A1 * | 4/2011 | Glasco | G06F 12/08 711/118 |
| 2011/0299317 | A1 * | 12/2011 | Shaeffer | G11C 13/0002 365/106 |
| 2012/0036334 | A1 * | 2/2012 | Horman | G06F 12/109 711/165 |
| 2012/0042146 | A1 * | 2/2012 | Gandhi | G06F 3/0611 711/165 |
| 2012/0137075 | A1 * | 5/2012 | Vorbach | G06F 9/526 711/122 |

FOREIGN PATENT DOCUMENTS

| | | |
|---|---|---|
| CN | 101315602 A | 12/2008 |
| CN | 101604283 A | 12/2009 |
| EP | 0 567 420 A1 | 10/1993 |

\* cited by examiner

METHOD AND APPARATUS FOR CONSTRUCTING MEMORY ACCESS MODEL

CROSS-REFERENCE TO RELATED APPLICATIONS

This application is a continuation of International Application No. PCT/CN2011/081544, filed on Oct. 31, 2011, which is hereby incorporated by reference in its entirety.

TECHNICAL FIELD

The present invention relates to the field of computers, and in particular, to a method and an apparatus for constructing a memory access model.

BACKGROUND

With the ever-changing development of computer technologies, the gap between the speed of a processor and a memory access speed is increasingly growing, and a memory system becomes a performance bottleneck; therefore, the memory system urgently needs to be optimized. If a memory access model of an application can be constructed, a proper method for optimizing the memory system may be proposed according to the constructed memory access model, so as to optimize the memory system.

Currently, there is a method for constructing a memory access model in the prior art, which specifically is: monitoring an application in real time in a computer system, if it is detected that the application accesses a memory, obtaining a memory access address each time when the application accesses the memory, storing the obtained memory access address in a designated area in the memory, and then constructing a memory access model of the application according to the memory access address stored in the designated area. After the memory access model of the application is constructed, a proper optimization method may be proposed for the memory system according to the constructed memory access model.

In the prior art, when the memory access model is constructed, the memory access address used each time when the application accesses the memory needs to be stored in the designated area in the memory, so a lot of memory will be consumed, and memory resources will be in short supply. As a result, the system performance is affected and a system breakdown is even caused.

SUMMARY

In order to reduce the memory consumption and impact on the system performance and avoid a system breakdown, embodiments of the present invention provide a method and an apparatus for constructing a memory access model. The technical solutions are described as follows:

A method for constructing a memory access model includes:

obtaining a page table corresponding to a process referencing a memory block, and clearing a Present (present) bit included in each page table entry stored in the page table, where the page table is used to store a page table entry of a page to be accessed by the process referencing the memory block;

monitoring the process referencing the memory block in real time and starting timing;

if the process referencing the memory block generates a missing page interrupt event when accessing a page in the memory block, increasing the number of access times of the page to be accessed, where the missing page interrupt event is generated when the process referencing the memory block determines that a Present bit included in a page table entry of the page to be accessed is cleared, and the page table entry of the page to be accessed is obtained by the process referencing the memory block from the page table corresponding to the process; and constructing a memory access model of the memory block according to the number of access times of each page in the memory block and time obtained through timing, where the memory access model at least includes the number of access times and an access frequency of each page in the memory block.

A method for constructing a memory access model includes:

obtaining a page table corresponding to a target process, and clearing a Present bit included in each page table entry stored in the page table, where the page table is used to store a page table entry of a page to be accessed by the target process;

monitoring the target process in real time and starting timing;

if the target process generates a missing page interrupt event when accessing a page to be accessed, increasing the number of access times of the page to be accessed, where the missing page interrupt event is generated by the target process when the target process determines that a Present bit included in a page table entry of the page to be accessed is cleared, and the page table entry of the page to be accessed is obtained by the target process from the page table corresponding to the target process; and constructing a memory access model of the target process according to the number of access times that each page is accessed by the target process and time obtained through timing, where the memory access model at least includes the number of access times and an access frequency that each page is accessed by the target process.

An apparatus for constructing a memory access model includes:

a first obtaining module, configured to obtain a page table corresponding to a process referencing a memory block, and clear a Present bit included in each page table entry stored in the page table, where the page table is used to store a page table entry of a page to be accessed by the process referencing the memory block;

a first monitoring module, configured to monitor the process referencing the memory block in real time and start timing;

a first increasing module, configured to: if the process referencing the memory block generates a missing page interrupt event when accessing a page in the memory block, increase the number of access times of the page to be accessed, where the missing page interrupt event is generated when the process referencing the memory block determines that a Present bit included in a page table entry of the page to be accessed is cleared, and the page table entry of the page to be accessed is obtained by the process referencing the memory block from the page table corresponding to the process; and a second obtaining module, configured to construct a memory access model of the memory block according to the number of access times of each page in the memory block and time obtained through timing, where the memory access model at least includes the number of access times and an access frequency of each page in the memory block.

An apparatus for constructing a memory access model includes:

a fifth obtaining module, configured to obtain a page table corresponding to a target process, and clear a Present bit included in each page table entry stored in the page table, where the page table is used to store a page table entry of a page to be accessed by the target process;

a second monitoring module, configured to monitor the target process in real time and start timing;

a second increasing module, configured to: if the target process generates a missing page interrupt event when accessing a page to be accessed, increase the number of access times of the page to be accessed, where the missing page interrupt event is generated by the target process when the target process determines that a Present bit included in a page table entry of the page to be accessed is cleared, and the page table entry of the page to be accessed is obtained by the target process from the page table corresponding to the target process; and a sixth obtaining module, configured to construct a memory access model of the target process according to the number of access times that each page is accessed by the target process and time obtained through timing, where the memory access model at least includes the number of access times and an access frequency that each page is accessed by the target process.

In the present invention, a page table corresponding to a process referencing a memory block is obtained, and a Present bit included in each page table entry in the obtained page table is cleared; the process referencing the memory block is monitored in real time and timing is started; if the process referencing the memory block generates a missing page interrupt event when accessing a page, the number of access times of the page to be accessed is increased; and a memory access model of the memory block is constructed according to the number of access times of each page in the memory block and time obtained through timing; or a page table corresponding to a target process is obtained, and a Present bit included in each page table entry in the obtained page table is cleared; the target process is monitored in real time and timing is started; if the target process generates a missing page interrupt event when accessing a page in a memory, the number of access times of the page to be accessed is increased; and a memory access model of the target process is constructed according to the number of access times of the page to be accessed by the target process and time obtained through timing; in this way, when the memory access model of the memory block is constructed, a memory access address for each process referencing the memory block to access the memory block does not need to be recorded, or when the memory access model of the target process is constructed, a memory access address for the target process to access the memory block does not need to be recorded, so as to reduce the memory consumption and an impact on the system performance, and avoid a system breakdown.

DETAILED DESCRIPTION

To make the objectives, technical solutions, and advantages of the present invention more comprehensible, the following further describes the embodiments of the present invention in detail with reference to the accompanying drawings.

Embodiment 1

Figure 1:
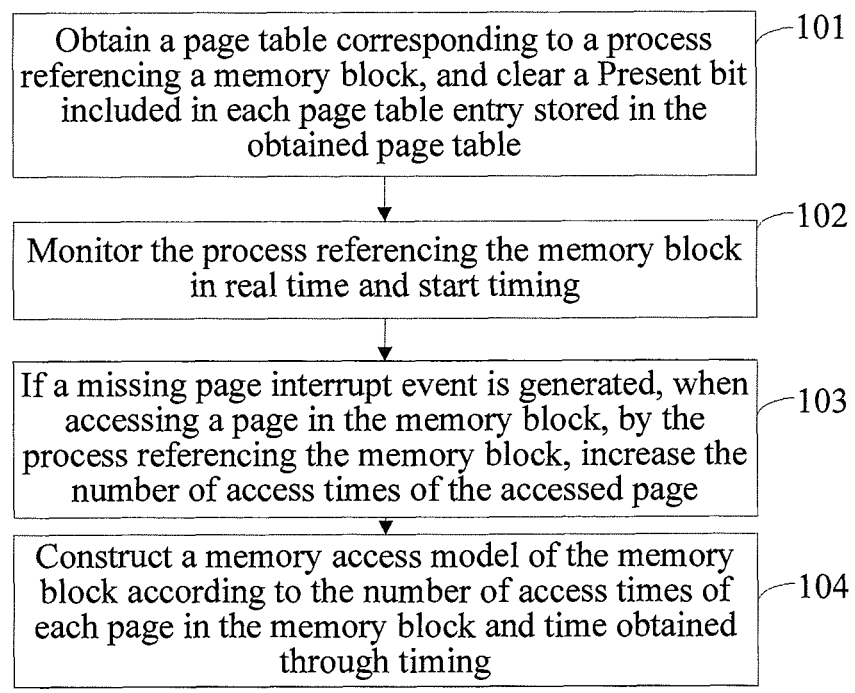
FIG. 1 is a flowchart of a method for constructing a memory access model according to Embodiment 1 of the present invention.

As shown in FIG. 1, an embodiment of the present invention provides a method for constructing a memory access model, including:

Step 101: Obtain a page table corresponding to a process referencing a memory block, and clear a Present bit included in each page table entry stored in the obtained page table.

The page table is used to store a page table entry of a page to be accessed by the process referencing the memory block.

Step 102: Monitor the process referencing the memory block in real time and start timing.

Step 103: If the process referencing the memory block generates a missing page interrupt event when accessing a page in the memory block, increase the number of access times of the page to be accessed.

The missing page interrupt event is generated when the process referencing the memory block determines that a Present bit included in a page table entry of the page to be accessed is cleared, and the page table entry of the page to be accessed is obtained by the process referencing the memory block from the page table corresponding to the process.

Step 104: Construct a memory access model of the memory block according to the number of access times of each page in the memory block and time obtained through timing, where the memory access model at least includes the number of access times and an access frequency of each page in the memory block.

In the embodiment of the present invention, a page table corresponding to a process referencing a memory block is obtained, and a Present bit included in each page table entry in the obtained page table is cleared; the process referencing the memory block is monitored in real time and timing is started; if the process referencing the memory block generates a missing page interrupt event when accessing a page, the number of access times of the page to be accessed is increased; and a memory access model of the memory block is constructed according to the number of access times of each page in the memory block and time obtained through timing; in this way, when the memory access model of the memory block is constructed, a memory access address for each process referencing the memory block to access the memory does not need to be recorded, so as to reduce the memory consumption and an impact on the system performance, and avoid a system breakdown.

Embodiment 2

Figure 2A:
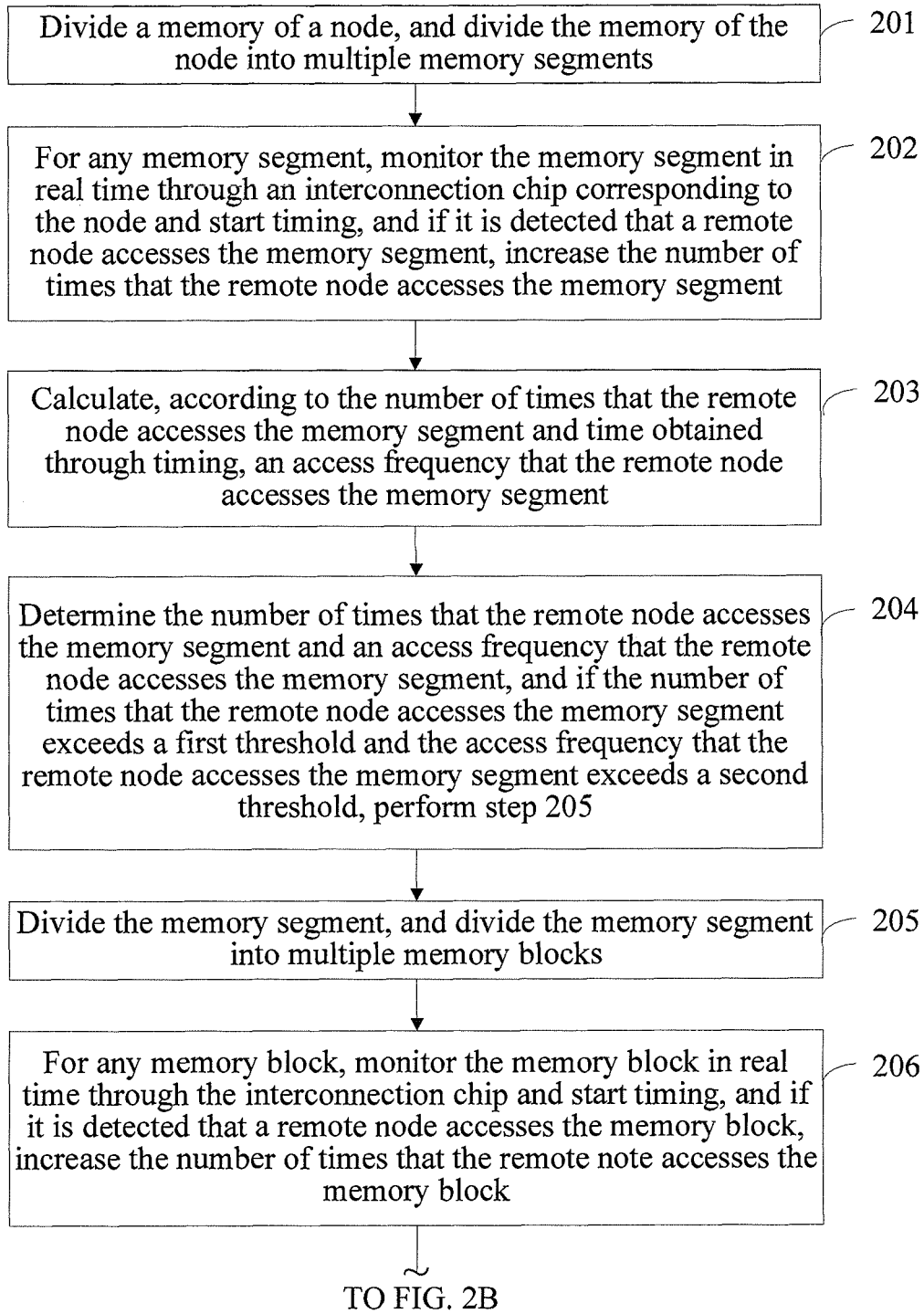
FIG. 2A and FIG. 2B are a flowchart of a method for constructing a memory access model according to Embodiment 2 of the present invention.
Figure 2B:
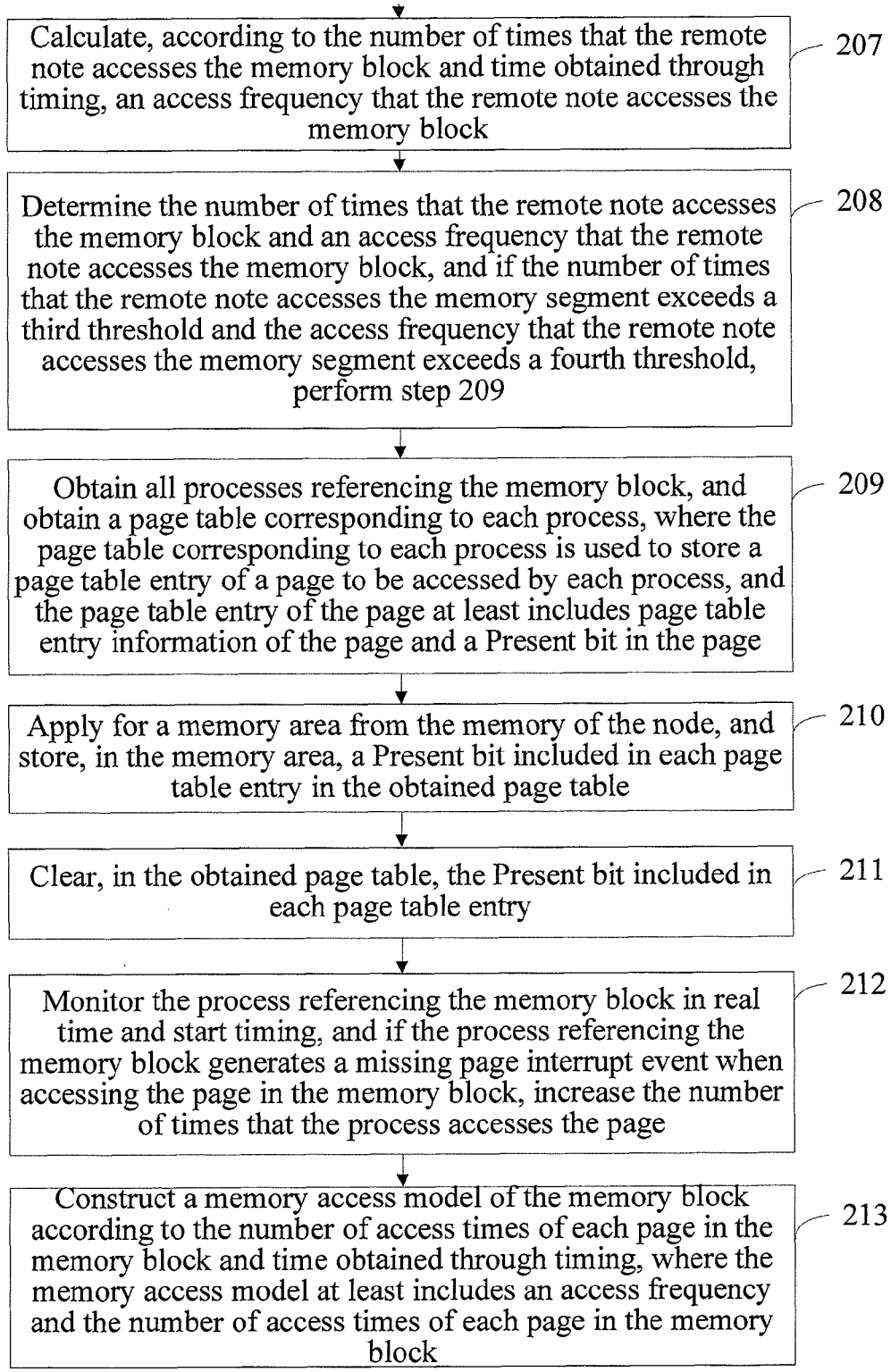

As shown in FIG. 2A and FIG. 2B, an embodiment of the present invention provides a method for constructing a memory access model, including:

Step 201: Divide a memory of a node, and divide the memory of the node into multiple memory segments.

The memory of the node may be divided into multiple memory segments through a preset division policy, where the preset division policy may include: dividing the memory of the node into multiple memory segments with a same size.

A computer system includes multiple nodes, and each node at least includes a CPU (Central Processing Unit, central processing unit) and a memory. For any node, that a device such as a CPU in the node accesses the memory in the node is called accessing a local memory, and in the computer system, that another node other than the node accesses the memory in the node is called a remote node accessing the memory.

Step 202: For any memory segment, monitor the memory segment in real time through an interconnection chip corresponding to the node and start timing, and if it is detected that a remote node (another node other than the node) accesses the memory segment, increase the number of times that the remote node accesses the memory segment.

Each node has a corresponding interconnection chip, and for any node, if a remote node needs to access a memory of the node, the remote node needs to access the memory of the node through an interconnection chip of the node; therefore, in this embodiment, whether a remote node accesses a memory segment in the node may be monitored through the interconnection chip corresponding to the node.

The interconnection chip includes multiple timers and multiple counters. In this embodiment, a corresponding timer and counter may be selected for the memory segment from the multiple timers and the multiple counters that are included in the interconnection chip. The timer is used for timing, and the counter is used to collect statistics on the number of times that the remote node accesses the memory segment, that is, if it is detected through the interconnection chip that a remote node accesses the memory segment, the number of times that the remote node accesses the memory segment is increased by increasing a value of the counter. In addition, an initial value of the counter may be 0 or the like, the increased number of times that the remote node accesses the memory segment may be 1 or the like, and specific values of the both are not limited in this embodiment.

Step 203: Calculate, according to the number of times that the remote node accesses the memory segment and time obtained through timing, an access frequency that the remote node accesses the memory segment.

The access frequency that the remote node accesses the memory segment may be periodically calculated. Specifically, the time obtained through timing is read from a timer corresponding to the memory segment, the number of times that the remote node accesses the memory segment is read from a counter corresponding to the memory segment, and a ratio operation is performed on the number of times that the remote node accesses the memory segment and the time obtained through timing, so as to obtain the access frequency that the remote node accesses the memory segment.

In this embodiment, a corresponding timer and counter may be selected for each memory segment included in the node from the interconnection chip corresponding to the node; in this way, each memory segment included in the node may be monitored in real time through the interconnection chip, so as to obtain the number of times that the remote node accesses each memory segment, and then, an access frequency that the remote node accesses each memory segment is periodically calculated.

Step 204: Determine whether the number of times that the remote node accesses the memory segment exceeds a first threshold and whether the access frequency that the remote node accesses the memory segment exceeds a second threshold, and if the number of times that the remote node accesses the memory segment exceeds the first threshold and the access frequency that the remote node accesses the memory segment exceeds the second threshold, perform step 205.

If the number of times that the remote node accesses the memory segment does not exceed the first threshold or the access frequency that the remote node accesses the memory segment does not exceed the second threshold, whether a remote node accesses the memory segment is continually monitored in real time.

Step 205: Divide the memory segment, and divide the memory segment into multiple memory blocks.

The memory segment may be divided through a preset division policy, and the memory segment is divided into multiple memory blocks.

Step 206: For any memory block, monitor the memory block in real time through the interconnection chip and start timing, and if it is detected that a remote node accesses the memory block, increase the number of times that the remote node accesses the memory block.

In this embodiment, a corresponding counter and timer may be selected for each memory block from remaining counters and timers in the interconnection chip. Each counter is used to collect statistics on the number of times of accessing a memory block corresponding to the counter by the remote node, that is, for any memory block, if it is detected that a remote node accesses the memory block, the number of times that the remote node accesses the memory block is increased by increasing a value of a counter corresponding to the memory block.

Step 207: Calculate, according to the number of times that the remote node accesses the memory block and time obtained through timing, an access frequency that the remote node accesses the memory block.

The access frequency that the remote node accesses the memory block may be periodically calculated. Specifically, a ratio operation is performed on the number of times that the remote node accesses the memory block and the time obtained through timing, so as to obtain the access frequency that the remote node accesses the memory block.

In this embodiment, an access frequency that the remote node accesses each memory block can be calculated according to the foregoing step 206 and step 207.

Step 208: Determine whether the number of times that the remote node accesses the memory block exceeds a third threshold and whether the access frequency that the remote node accesses the memory block exceeds a fourth threshold, and if the number of times of accessing the memory segment by the remote node exceeds the third threshold and the access frequency that the remote node accesses the memory segment exceeds the fourth threshold, perform step 209.

If the number of access times that the remote node accesses the memory block does not exceed the third threshold or the access frequency that the remote node accesses the memory block does not exceed the fourth threshold, whether a remote node accesses the memory block is continually monitored in real time.

The third threshold may be equal to, greater than, or less than the first threshold, and the fourth threshold may be equal to, greater than, or less than the second threshold.

In this embodiment, if the number of times that the remote node accesses the memory block exceeds the third threshold and the access frequency that the remote node accesses the memory block exceeds the fourth threshold, a corresponding statistical thread may be established for the memory block, and the following steps are performed through the statistical thread.

Step 209: Obtain, through a reverse mapping method, all processes referencing the memory block, and obtain a page table corresponding to each process, where the page table corresponding to each process is used to store a page table entry of a page to be accessed by each process, and the page table entry of the page at least includes page table entry information of the page and a Present bit of the page.

The smallest unit of a memory is a page, each memory block includes one or more pages, each process accessing the memory corresponds to one page table, and a page table entry of a page to be accessed by the process is stored in the page table, where each page table entry in the page table includes a Present bit and page table entry information. If a page is valid, a Present bit included in a page table entry of the page is set, and the process can access the page; and if a page is invalid, a Present bit included in a page table entry of the page is cleared, and the process cannot directly access the page.

Step 210: Apply for a memory area from the memory of the node, and store, in the memory area, the Present bit included in each page table entry in the obtained page table.

Specifically, a memory area is divided from the memory of the node. For any obtained page table, a process number of a process corresponding to the page table is obtained, a memory address for storing, in the memory area, the Present bit included in each page table entry is calculated according to a sequence number, in the page table, of each page table entry in the page table, the obtained process number, and a start address of the memory area and through a preset calculation model, and the Present bit included in each page table entry in the page table is stored in the memory area according to the memory address for storing the Present bit included in each page table entry. For each of other obtained page tables, a Present bit included in each page table entry in each of the other page tables is stored in the memory area according to a same method as described above.

The preset calculation model may be shown by formula (I), where Memoryaddress is the memory address, Startaddress is the start address of the memory area, ProcessID is the process number, element is a coefficient, and number is the sequence number, in the page table, of the page table entry:

$$\text{Memoryaddress} = \text{Startaddress} + \text{ProcessID} \times \text{element} + \text{number} \quad (1)$$

Step 211: Clear, in the obtained page table, the Present bit included in each page table entry.

When the process needs to access a page in the memory, the process first obtains, from the page table corresponding to the process, a page table entry corresponding to a page to be accessed, and performs determination on a Present bit included in the obtained page table entry. If the Present bit included in the obtained page table entry is set, the process obtains, according to page table entry information, which is included in the obtained page table entry, of the page that needs to be accessed, a start address of the page that needs to be accessed, searches, according to the obtained start address, the memory for the page that needs to be accessed, and then performs a data read-write operation in the found page to implement access to the page that needs to be accessed; and if the Present bit included in the obtained page table entry is cleared, the process generates a missing page interrupt event.

For any process, a procedure where the process accesses the page in the memory cannot be detected, but the missing page interrupt event generated by the process can be detected. If the Present bit included in the page table entry of the page that needs to be accessed and obtained by the process from the page table corresponding to the process is cleared, the process generates a missing page interrupt event. The missing page interrupt event generated by the process can be detected, and the page in the memory that is accessed by the process is determined according to the missing page interrupt event. Therefore, in this embodiment, a Present bit included in a page table entry of each page is all cleared in the page table corresponding to each process referencing the memory block; in this way, when accessing the page in the memory block, the process referencing the memory block generates a missing page interrupt event. In addition, the missing page interrupt event generated by the process is detected, and then, the page in the memory block that is accessed by the process is determined according to the missing page interrupt event.

Step 212: Monitor the process referencing the memory block in real time and start timing, and if the process referencing the memory block generates a missing page interrupt event when accessing the page in the memory block, increase the number of times that the process accesses the page.

Specifically, the process referencing the memory block is monitored in real time and timing is started, and if it is detected that the process referencing the memory block generates a missing page interrupt event when accessing the page in the memory block, the page table entry information included in the page table entry of the page to be accessed is obtained, the start address of the page to be accessed is obtained according to the page table entry information, the page to be accessed is determined according to the obtained start address, and the number of access times of the page to be accessed is increased, where the missing page interrupt event is generated by the process when the process determines that the Present bit included in the page table entry of the page to be accessed is cleared, and the page table entry of the page to be accessed is obtained by the process from the page table corresponding to the process.

In this embodiment, a corresponding timer may be set for the memory block and a corresponding counter may be set for each page included in the memory block. The counter corresponding to each page is used to collect statistics on the number of access times of the page corresponding to the counter, that is, the number of access times of a page is increased by increasing a value of a counter corresponding to the page. A large number of pages included in the memory block may exist; therefore, the counter corresponding to each page included the memory block adopts a software form to implement statistics collection on the number of access times of each page.

In this embodiment, because all the processes referencing the memory block are monitored, the number of access times of each page in the memory block may be obtained through statistics collecting.

Further, in order to ensure that the process can normally access the page to be accessed, in this embodiment, after the number of times that the process accesses the page is increased, the following step (1) to step (3) may be further performed, which respectively are:

(1): Obtain, from the memory area, the Present bit of the page to be accessed by the process, determine, according to the obtained Present bit, whether the page to be accessed by the process is valid in the memory of the node, and if the page is valid, perform (2).

Specifically, the memory address is calculated according to the process number of the process, the sequence number, in the page table, of the page table entry of the page to be accessed by the process, and the start address of the memory area, and through the preset calculation model, the Present bit of the page to be accessed by the process is read from a corresponding space in the memory area according to the calculated memory address, determination is performed on the obtained Present bit and if the obtained Present bit is set it is determined that the page to be accessed by the process is valid; if the obtained Present bit is cleared, it is determined that the page to be accessed by the process is invalid.

If it is determined that the page to be accessed by the process is invalid, a missing page exception processing program needs to be triggered, and the triggered missing page exception processing program performs exception processing.

(2): Set, in the page table corresponding to the process, the Present bit included in the page table entry of the page to be accessed by the process, and trigger the process to re-access the page to be accessed.

After being triggered, the process obtains, from the page table corresponding to the process, the page table entry of the page to be accessed by the process, performs determination on the Present bit included in the obtained page table entry, and determines that the Present bit included in the obtained page table entry is set, then obtains, according to the page table entry information included in the obtained page table entry, the start address of the page to be accessed, finds the corresponding page from the memory block according to the obtained start address, and performs a data read-write operation in the found page; in this way, the process implements access to the page to be accessed.

(3): When the process finishes accessing the page to be accessed, clear, in the page table corresponding to the process, the Present bit included in the page table entry of the page accessed by the process.

Step 213: Construct a memory access model of the memory block according to the number of access times of each page in the memory block and time obtained through timing, where the memory access model at least includes an access frequency and the number of access times of each page in the memory block.

The memory access model may be periodically constructed. Specifically, a ratio operation is respectively performed on the number of access times of each page in the memory block and the time obtained through timing, so as to obtain the access frequency of each page included in the memory block, thereby obtaining the memory access model of the memory block, where the memory access model at least includes the access frequency and the number of access times of each page in the memory block.

In the embodiment of the present invention, a memory block with the number of access times that the remote node accesses the memory block exceeding a third threshold and an access frequency that the remote node accesses the memory block exceeding a fourth threshold is obtained; a page table corresponding to a process referencing the memory block is obtained, and a Present bit in each page table entry in the obtained page table is cleared; the process referencing the memory block is monitored in real time and timing is started; if it is detected that the process referencing the memory block generates a missing page interrupt event when accessing a page, the number of access times of the page to be accessed is increased; and a memory access model is constructed according to the number of access times of each page in the memory block and time obtained through timing; in this way, when the memory access model is constructed, a memory access address for each process referencing the memory block to access the memory block does not need to be recorded, so as to reduce the memory consumption and an impact on the system performance, and avoid a system breakdown.

Embodiment 3

Figure 3:
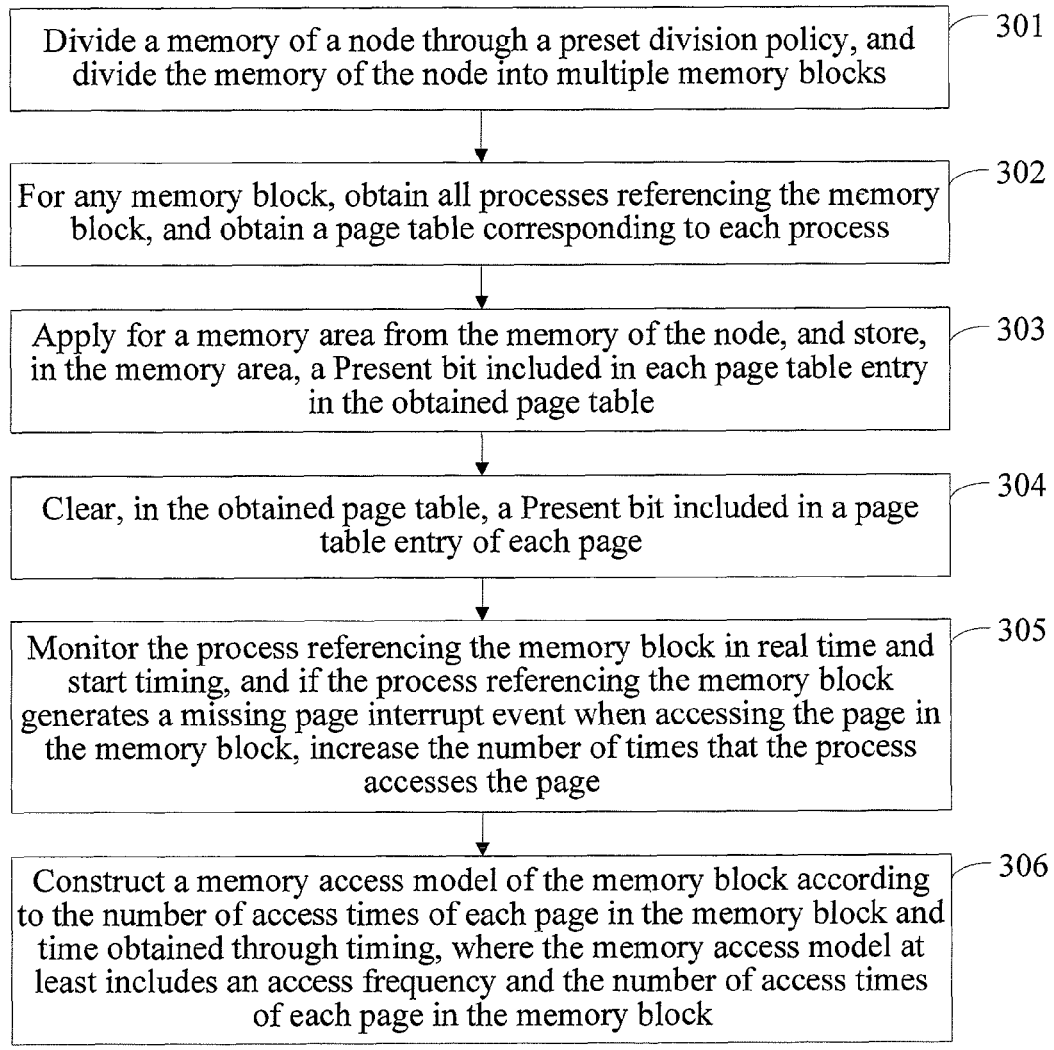
FIG. 3 is a flowchart of a method for constructing a memory access model according to Embodiment 3 of the present invention.

As shown in FIG. 3, an embodiment of the present invention provides a method for constructing a memory access model, including:

Step 301: Divide a memory of a node through a preset division policy, and divide the memory of the node into multiple memory blocks.

Step 302: For any memory block, obtain, through a reverse mapping method, all processes referencing the memory block, and obtain a page table corresponding to each process, where the page table corresponding to each process is used to store a page table entry of a page to be accessed by each process, and the page table entry of the page at least includes page table entry information of the page and a Present bit of the page.

The smallest unit of a memory is a page, each memory block includes one or more pages, each process accessing the memory corresponds to one page table, and a page table entry of a page to be accessed by each process is stored in the page table, where each page table entry in the page table includes a Present bit and page table entry information. If a page is valid, a Present bit included in a page table entry of the page is set, and the process can access the page; and if a page is invalid, a Present bit included in a page table entry of the page is cleared, and the process cannot directly access the page.

Step 303: Apply for a memory area from the memory of the node, and store, in the memory area, the Present bit included in each page table entry in the obtained page table.

Specifically, a memory area is divided from the memory of the node. For any obtained page table, a process number of a process corresponding to the page table is obtained, a memory address for storing, in the memory area, the Present bit included in each page table entry of the page table is calculated according to a sequence number, in the page table, of each page table entry in the page table, the obtained process number, and a start address of the memory area and through a preset calculation model, and the Present bit included in each page table entry in the page table is stored in a corresponding memory space according to the memory address for storing the Present bit included in each page table entry. For each of other obtained page tables, a Present bit included in each page table entry in each of the other page tables is stored in the memory area according to a same method as described above.

Step 304: Clear, in the obtained page table, a Present bit included in a page table entry of each page.

When the process needs to access a page in the memory, the process first obtains, from the page table corresponding to the process, a page table entry corresponding to a page to be accessed, and performs determination on a Present bit included in the obtained page table entry. If the Present bit included in the obtained page table entry is set, the process obtains, according to page table entry information, which is included in the obtained page table entry, of the page that needs to be accessed, a start address of the page that needs to be accessed, searches, according to the obtained start address of the page, the memory for the page that needs to be accessed, and then, performs a data read-write operation in the found page to implement access to the page that needs to be accessed; and if the Present bit included in the obtained page table entry is cleared, the process generates a missing page interrupt event.

In this embodiment, a Present bit included in a page table entry of each page is all cleared in the page table corresponding to each process referencing the memory block; in this way, when accessing the page in the memory block, the process referencing the memory block generates a missing page interrupt event. In addition, the missing page interrupt event generated by the process is detected, and then, the page in the memory block that is accessed by the process is determined according to the missing page interrupt event.

Step 305: Monitor the process referencing the memory block in real time and start timing, and if the process referencing the memory block generates a missing page interrupt event when accessing the page in the memory block, increase the number of times that the process accesses the page.

Specifically, the process referencing the memory block is monitored in real time and timing is started, and if it is detected that the process referencing the memory block generates a missing page interrupt event when accessing the page in the memory block, the page table entry information included in the page table entry of the page to be accessed is obtained, the start address of the page to be accessed by the process is obtained according to the page table entry information, the corresponding page is determined according to the obtained start address, and the number of access times of the determined page is increased, where the missing page interrupt event is generated by the process when the process determines that the Present bit included in the page table entry of the page to be accessed is cleared, and the page table entry of the page to be accessed is obtained by the process from the page table corresponding to the process.

In this embodiment, a corresponding timer may be set for the memory block and a corresponding counter may be set for each page included in the memory block. The counter corresponding to each page is used to collect statistics on the number of access times of the page corresponding to the counter, that is, the number of access times of a page is increased by increasing a value of a counter corresponding to the page. A large number of pages included in the memory block may exist; therefore, the counter corresponding to each page included the memory block adopts a software form to implement statistics collection on the number of access times of each page.

In this embodiment, because all the processes referencing the memory block are monitored, the number of access times of each page in the memory block may be obtained through statistics collecting.

Further, in order to ensure that the process can normally access the page to be accessed, in this embodiment, after the number of times that the process accesses the page is increased, the following step (a) to step (c) may be further performed, which respectively are:

(a): Obtain, from the memory area, the Present bit of the page to be accessed by the process, determine, according to the obtained Present bit, whether the page to be accessed by the process is valid in the memory, and if the page is valid, perform step (b).

Specifically, the memory address is calculated according to the process number of the process, the sequence number, in the page table, of the page table entry of the page to be accessed by the process, and the start address of the memory area, and through the preset calculation model, the Present bit of the page to be accessed by the process is read from a corresponding space in the memory area according to the calculated memory address, determination is performed on the obtained Present bit, and if the obtained Present bit is set, it is determined that the page to be accessed by the process is valid; if the obtained Present bit is cleared, it is determined that the page to be accessed by the process is invalid.

If it is determined that the page to be accessed by the process is invalid, a missing page exception processing program needs to be triggered, and the triggered missing page exception processing program performs exception processing.

(b): Set, in the page table corresponding to the process, the Present bit included in the page table entry of the page to be accessed by the process, and trigger the process to re-access the page to be accessed.

After being triggered, the process obtains, from the page table corresponding to the process, the page table entry of the page that needs to be accessed by the process, performs determination on the Present bit included in the obtained page table entry, and determines that the Present bit included in the obtained page table entry is set, then obtains, according to the page table entry information included in the obtained page table entry, the start address of the page to be accessed, finds the corresponding page from the memory block according to the obtained start address, and performs a data read-write operation in the found page; in this way, the process implements access to the page to be accessed.

(c): When the process finishes accessing the page to be accessed, clear, in the page table corresponding to the process, the Present bit included in the page table entry of the page to be accessed by the process.

Step 306: Construct a memory access model of the memory block according to the number of access times of each page in the memory block and time obtained through timing, where the memory access model at least includes an access frequency and the number of access times of each page in the memory block.

Specifically, a ratio operation is respectively performed on the number of access times of each page in the memory block and the time obtained through timing, so as to obtain the access frequency of each page included in the memory block, thereby obtaining the memory access model of the memory block, where the memory access model at least includes the access frequency and the number of access times of each page in the memory block.

In the embodiment of the present invention, a page table corresponding to a process referencing a memory block is obtained, and a Present bit in each page table entry in the obtained page table is cleared; the process referencing the memory block is monitored in real time and timing is started, if it is detected that the process referencing the memory block generates a missing page interrupt event when accessing a page, the number of access times of the page to be accessed is increased; and a memory access model of the memory block is constructed according to the number of access times of each page in the memory block and time obtained through timing; in this way, when the memory access model is constructed, a memory access address for each process referencing the memory block to access the memory block does not need to be recorded, so as to reduce the memory consumption and an impact on the system performance, and avoid a system breakdown.

Embodiment 4

Figure 4:
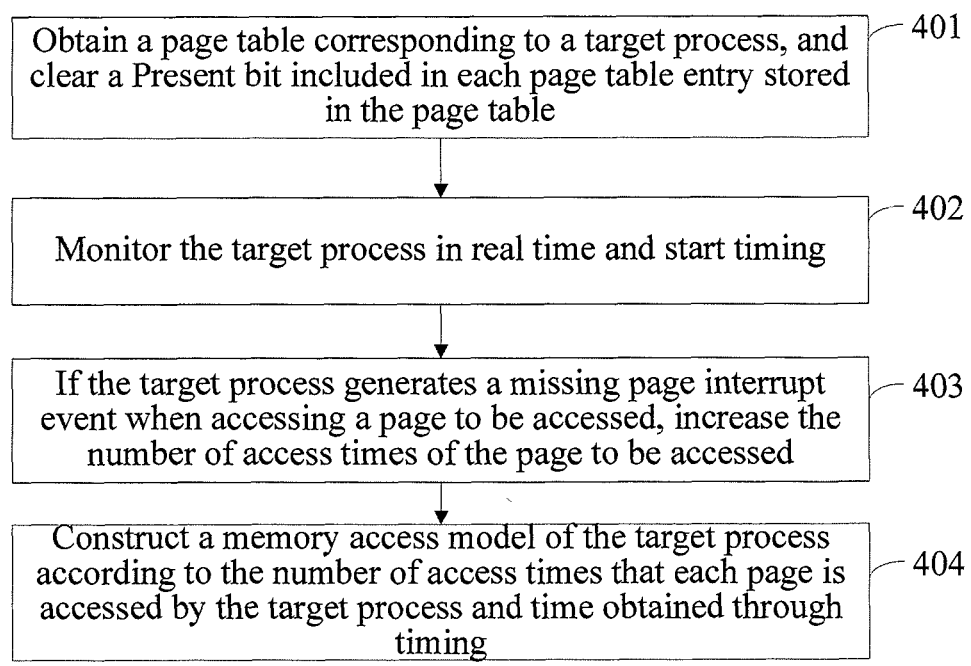
FIG. 4 is a flowchart of a method for constructing a memory access model according to Embodiment 4 of the present invention.

As shown in FIG. 4, an embodiment of the present invention provides a method for constructing a memory access model, including:

Step 401: Obtain a page table corresponding to a target process, and clear a Present bit included in each page table entry stored in the page table, where the page table is used to store a page table entry of a page to be accessed by the target process.

Step 402: Monitor the target process in real time and start timing.

Step 403: If the target process generates a missing page interrupt event when accessing a page to be accessed, increase the number of access times of the page to be accessed.

The missing page interrupt event is generated by the target process when the target process determines that a Present bit included in a page table entry of the page to be accessed is cleared, and the page table entry of the page to be accessed is obtained by the target process from the page table corresponding to the target process.

Step 404: Construct a memory access model of the target process according to the number of access times that each page is accessed by the target process and time obtained through timing, where the memory access model at least includes the number of access times and an access frequency that each page is accessed by the target process.

In the embodiment of the present invention, a page table corresponding a target process is obtained, and a Present bit included in each page table entry in the page table is cleared; the target process is monitored in real time and timing is started; if the target process generates a missing page interrupt event when accessing a page to be accessed, the number of access times of the page to be accessed is increased; and a memory access model of the target process is constructed according to the number of access times that each page is accessed by the target process and time obtained through timing; in this way, when the memory access model of the target process is constructed, a memory access address for the target process to access a memory block does not need to be recorded, so as to reduce the memory consumption and an impact on the system performance, and avoid a system breakdown.

Embodiment 5

Figure 5A:
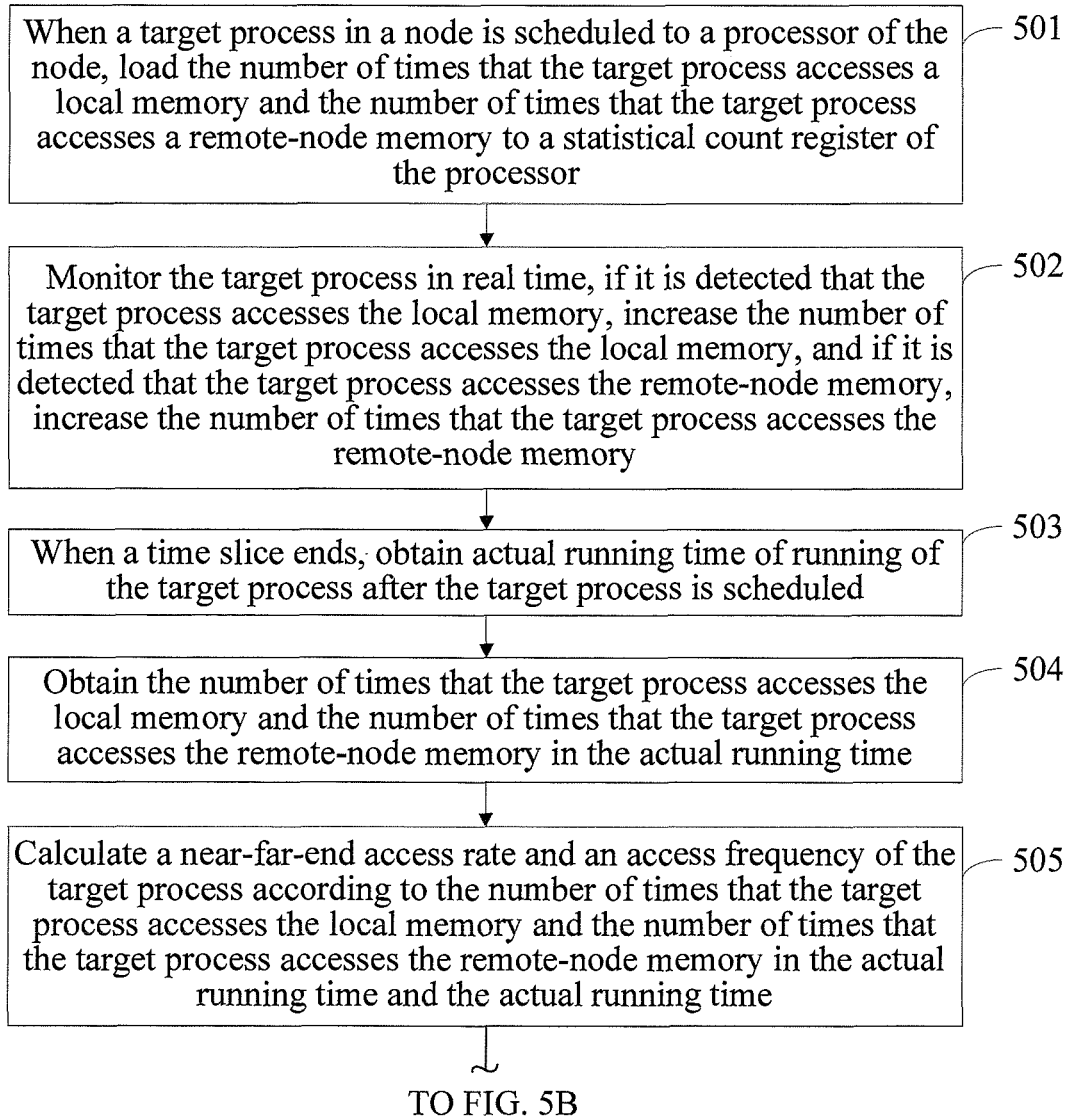
FIG. 5A and FIG. 5B are a flowchart of a method for constructing a memory access model according to Embodiment 5 of the present invention.
Figure 5B:
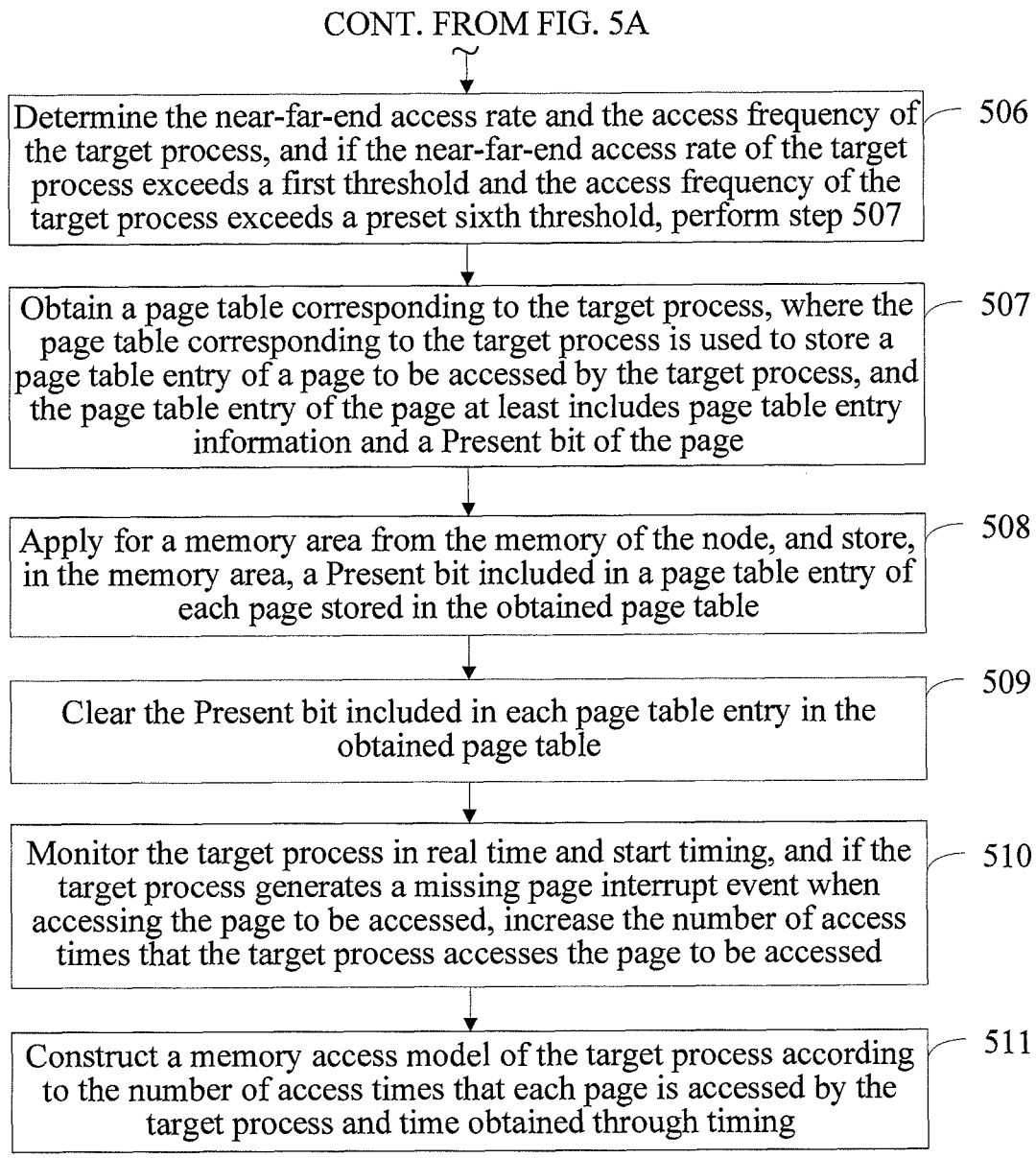

As shown in FIG. 5A and FIG. 5B, an embodiment of the present invention provides a method for constructing a memory access model, including:

Step 501: When a target process in a node is scheduled to a processor of the node, load the number of times that the target process accesses a local memory and the number of times that the target process accesses a remote-node memory to a statistical count register of the processor.

Context information of the target process includes the number of times that the target process accesses the local memory and the number of times that the target process accesses the remote-node memory. Specifically, when the process in the node is scheduled to the processor of the node, the number of times that the target process accesses the local memory and the number of times that the target process accesses the remote-node memory are extracted from the context information of the target process, and the extracted number of times that the target process accesses the local memory and number of times that the target process accesses the remote-node memory are loaded to the statistical count register of the processor.

The processor includes multiple counters, further, two counters are selected from the multiple counters included in the processor, which respectively are a first counter and a second counter, an initial value of the first counter is set to the number of times that the target process accesses the local memory, and an initial value of the second counter is set to the number of times that the target process accesses the remote-node memory.

A computer system includes multiple nodes, where a node at least includes a processor and a memory. When the processor of the node runs the target process, the target process needs to access a memory of the node, that is, the target process accesses a local memory, and the target process needs to access a memory of another node in the computer system, that is, the target process accesses a remote-node memory.

Step 502: Monitor the target process in real time through the processor, if it is detected that the target process accesses the local memory, increase the number of times that the target process accesses the local memory, and if it is detected that the target process accesses the remote-node memory, increase the number of times that the target process accesses the remote-node memory.

The number of times that the target process accesses the local memory can be increased by increasing a value of the first counter, and the number of times that the target process accesses the remote-node memory can be increased by increasing a value of the second counter.

When the processor runs the target process, if the target process needs to access the local memory, the target process invokes a local memory access event, and if the target process needs to access the remote-node memory, the target process invokes a remote-node memory access event; therefore, it may be detected in real time through the processor whether the target process accesses the local memory and the remote-node memory.

After the target process is scheduled by the processor, the processor allocates running time to the target process in each time slice, and then, in each time slice, the processor runs the target process in the running time allocated to the target process.

When the target process is scheduled to the processor, the number of times that the target process accesses the local memory and the number of times that the target process accesses the remote-node memory that are included in the context information of the target process are respectively updated to the increased number of times that the target process accesses the local memory and number of times that the target process accesses the remote-node memory.

Step 503: When a time slice ends, obtain actual running time of the target process after the target process is scheduled.

Specifically, a time slice through which the target process passes after the target process is scheduled to the processor is obtained, and running time of the target process in each obtained time slice is accumulated to obtain the actual running time of the target process.

Step 504: Obtain, according to the increased number of times that the target process accesses the local memory and number of times that the target process accesses the remote-node memory, and the number of times that the target process accesses the local memory and the number of times that the target process accesses the remote-node memory that are stored in the statistical count register, the number of times that the target process accesses the local memory and the number of times that the target process accesses the remote-node memory in the actual running time.

The number of times that the target process accesses the local memory may be read from the first counter, and the number of times that the target process accesses the remote-node memory may be read from the second counter. Specifically, the number of times that the target process accesses the local memory in the actual running time is calculated according to the number of times that the target process accesses the local memory and the number of times that the target process accesses the local memory that is stored in the statistical count register, and the number of times that the target process accesses the remote-node memory in the actual running time is calculated according to the number of times that the target process accesses the remote-node memory and the number of times that the target process accesses the remote-node memory that is stored in the statistical count register.

Step 505: Calculate a local-remote access ratio and an access frequency of the target process according to the number of times that the target process accesses the local memory and the number of times that the target process accesses the remote-node memory in the actual running time and the actual running time.

Specifically, a ratio of the number of times that the target process accesses the local memory to the number of times that the target process accesses the remote-node memory in the actual running time is calculated, the calculated ratio is used as the local-remote access ratio of the target process, the number of access times of the target process is calculated according to the number of times that the target process accesses the local memory and the number of times that the target process accesses the remote-node memory in the actual running time, and the access frequency of the target process is calculated according to the number of access times of the target process and the actual running time.

Step 506: Determine the local-remote access ratio and the access frequency of the target process, and if the local-remote access ratio of the target process exceeds a fifth threshold and the access frequency of the target process exceeds a preset sixth threshold, perform step 507.

If the local-remote access ratio of the target process does not exceed a fifth threshold or the access frequency of the target process does not exceed the sixth threshold, step 503 is continually performed.

Step 507: Obtain a page table corresponding to the target process, where the page table corresponding to the target process is used to store a page table entry of a page to be accessed by the target process, and the page table entry of the page at least includes page table entry information and a Present bit of the page.

The smallest unit of a memory is a page, each process corresponds to one page table, and a page table entry of a page to be accessed by a process is stored in the page table, where each page in the memory corresponds to one Present bit. If a page is valid, a Present bit corresponding to the page is set, and the process can access the page; if a page is invalid, a Present bit corresponding to the page is cleared, and the process cannot directly access the page.

Step 508: Apply for a memory area from the memory of the node, and store, in the memory area, a Present bit included in a page table entry of each page stored in the obtained page table.

Specifically, a memory area is divided from the memory of the node. A process number of the target process is obtained, a memory address for storing, in the memory area, the Present bit included in each page table entry in the page table is calculated according to a sequence number, in the page table, of each page table entry in the page table, the obtained process number, and a start address of the memory area and through a preset calculation model, and the Present bit included in each page table entry in the page table is stored in the memory area according to the memory address for storing the Present bit included in each page table entry in the page table.

Step 509: Clear the Present bit included in each page table entry in the obtained page table.

When the target process accesses a page in the memory, the target process first obtains, from the page table corresponding to the target process, a page table entry of a page to be accessed by itself, and performs determination on a Present bit included in the obtained page table entry; because the Present bit in each page stored in the page table corresponding to the target process is cleared, the target process determines that the Present bit included in the obtained page table entry is cleared, and then the target process generates a missing page interrupt event.

Step 510: Monitor the target process in real time and start timing, and if the target process generates a missing page interrupt event when accessing the page to be accessed, increase the number of access times that the target process accesses the page to be accessed.

Specifically, the target process is monitored in real time and timing is started, if the missing page interrupt event that is generated by the target process when the target process accesses the page to be accessed in the memory is detected, the page table entry of the page to be accessed is obtained, and a start address of the page to be accessed is obtained according to the page table entry information of the page to be accessed that is included in the page table entry, the page to be accessed is determined according to the obtained start address, and the number of access times of the page to be accessed is increased, where the missing page interrupt event is generated by the target process when the target process determines that the Present bit included in the page table entry of the page to be accessed is cleared, and the page table entry of the page to be accessed is obtained by the target process from the page table corresponding to the target process.

Further, in order to ensure that the target process can normally access the page to be accessed, in this embodiment, after the number of times that the target process accesses the page to be accessed is increased, the following step (A) to step (C) may be further performed, which respectively are:

(A): Obtain, from the memory area, the Present bit of the page to be accessed, determine, according to the Present bit of the page to be accessed, whether the page to be accessed is valid in the memory, and if the page is valid, perform step 513.

Specifically, the memory address is calculated according to the process number of the target process, the sequence number, in the page table, of the page table entry of the page to be accessed, and the start address of the memory area and through the preset calculation model, the Present bit of the page to be accessed is read from the memory area according to the calculated memory address, determination is performed on the obtained Present bit, and if the obtained Present bit is set, it is determined that the page to be accessed is valid; if the obtained Present bit is cleared, it is determined that the page to be accessed is invalid.

If it is determined that the page to be accessed is invalid, a missing page exception processing program needs to be triggered, and the triggered missing page exception processing program performs exception processing.

(B): Set, in the page table corresponding to the target process, the Present bit included in the page table entry of the page to be accessed, and trigger the target process to re-access the page to be accessed.

After being triggered, the target process obtains, from the page table corresponding to the target process, the page table entry of the page to be accessed, performs determination on the Present bit included in the obtained page table entry, and determines that the Present bit included in the obtained page table entry is set, then obtains, according to the page table entry information of the page to be accessed that is included in the obtained page table entry, the start address of the page to be accessed, finds the corresponding page from the memory of the node according to the obtained start address, and performs a data read-write operation in the found page; in this way, the target process implements access to the page to be accessed.

(C): When the target process finishes accessing the page to be accessed, clear, in the page table corresponding to the target process, the Present bit included in the page table entry of the page to be accessed.

Step 511: Construct a memory access model of the target process according to the number of access times that each page is accessed by the target process and time obtained through timing, where the memory access model at least includes the number of access times and an access frequency that each page is accessed by the target process.

The memory access model may be periodically constructed. Specifically, a ratio operation is respectively performed on the number of access times that each page is accessed by the target process and the time obtained through timing, so as to obtain the access frequency of accessing each page by the target process, thereby obtaining the memory access model of the target process, where the memory access model at least includes the number of access times and the access frequency that each page is accessed by the target process.

Further, the memory access model may further include the local-remote access ratio of the target process.

In the embodiment of the present invention, a page table corresponding a target process is obtained, and a Present bit in each page table entry in the page table is cleared; the target process is monitored in real time and timing is started; if a missing page interrupt event that is generated by the target process when the target process accesses a page to be accessed is detected, the number of access times of the page to be accessed is increased; and a memory access model of the target process is constructed according to the number of access times that each page is accessed by the target process and time obtained through timing; in this way, when the memory access model of the target process is constructed, a memory access address for the target process to access a memory block does not need to be recorded, so as to reduce the memory consumption and an impact on the system performance, and avoid a system breakdown.

Embodiment 6

Figure 6:
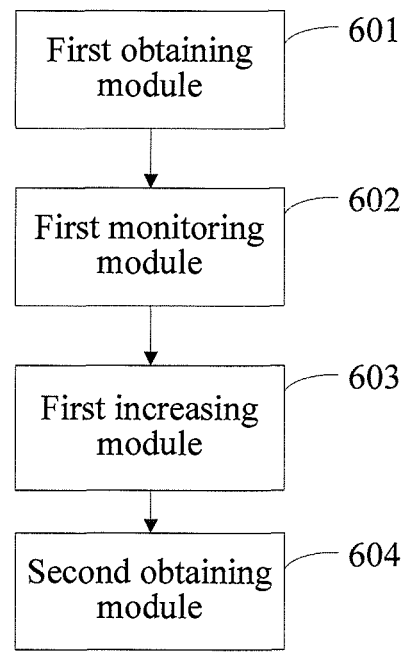
FIG. 6 is a schematic diagram of an apparatus for constructing a memory access model according to Embodiment 6 of the present invention.

As shown in FIG. 6, an embodiment of the present invention provides an apparatus for constructing a memory access model, including:

a first obtaining module 601, configured to obtain a page table corresponding to a process referencing a memory block, and clear a Present bit included in each page table entry stored in the obtained page table, where the page table is used to store a page table entry of a page to be accessed by the process referencing the memory block;

a first monitoring module 602, configured to monitor the process referencing the memory block in real time and start timing;

a first increasing module 603, configured to: if it is detected that the process referencing the memory block generates a missing page interrupt event when accessing a page in the memory block, increase the number of access times of the page to be accessed, where the missing page interrupt event is generated when the process referencing the memory block determines that a Present bit included in a page table entry of the page to be accessed is cleared, and the page table entry of the page to be accessed is obtained by the process referencing the memory block from the page table corresponding to the process; and a second obtaining module 604, configured to construct a memory access model of the memory block according to the number of access times of each page in the memory block and time obtained through timing, where the memory access model at least includes the number of access times and an access frequency of each page in the memory block.

The first obtaining module 601 includes:

a first obtaining unit, configured to obtain, through a reverse mapping method, the process referencing the memory block and further obtain the page table corresponding to the process referencing the memory block;

a first storage unit, configured to apply for a memory area from a memory of a node, and store, in the memory area, the Present bit included in each page table entry in the obtained page table; and a first clearing unit, configured to clear the Present bit included in each page table entry in the obtained page table.

The first storage unit includes:

a first calculation subunit, configured to apply for a memory area from the memory of the node, and calculate, according to a process number of the process referencing the memory block, a sequence number, in the page table, of each page table entry in the obtained page table, and a start address of the memory area and through a preset calculation model, a storage address for storing, in the memory area the Present bit included in each page table entry in the obtained page table; and a first storage subunit, configured to store, in the memory area, the Present bit included in each page table entry in the obtained page table according to the storage address of the Present bit included in each page table entry in the obtained page table.

The second obtaining module 604 is specifically configured to calculate the access frequency of each page in the memory block according to the number of access times of each page in the memory block and the time obtained through timing, so as to obtain the memory access model, where the memory access model at least includes the number of access times and the access frequency of each page in the memory block.

Further, the apparatus further includes:

a third obtaining module, configured to divide the memory of the node into multiple memory segments, and obtain the number of access times and an access frequency that a remote node accesses the memory segment, where the remote node is another node other than the node in a computer system;

a first division module, configured to: if a memory segment with the number of access times that the remote node accesses the memory segment exceeding a first threshold and an access frequency that the remote node accesses the memory segment exceeding a second threshold exists, divide the memory segment into multiple memory blocks; and a fourth obtaining module, configured to obtain the number of access times and an access frequency that the remote node accesses the memory block, and if a memory block with the number of times that the remote node accesses the memory block exceeding a third threshold and an access frequency that the remote node accesses the memory block exceeding a fourth threshold exists, perform an operation of obtaining the page table corresponding to the process referencing the memory block.

The third obtaining module includes:

a first monitoring unit, configured to divide the memory of the node into multiple memory segments, monitor the memory segment in real time through an interconnection chip corresponding to the node and start timing, and if it is detected that the remote node accesses the memory segment, increase the number of access times that the remote node accesses the memory segment; and a first calculation unit, configured to calculate, according to the number of access times that the remote node accesses the memory segment and time obtained through timing, the access frequency that the remote node accesses the memory segment.

The fourth obtaining module includes:

a second monitoring unit, configured to monitor the memory block in real time through an interconnection chip corresponding to the node and start timing, and if it is detected that the remote node accesses the memory block, increase the number of access times that the remote node accesses the memory block; and a second calculation unit, configured to calculate, according to the number of access times that the remote node accesses the memory block and time obtained through timing, the access frequency that the remote node accesses the memory block.

Further, the apparatus further includes:

a first determination module, configured to obtain the Present bit of the page to be accessed from the memory area, and determine, according to the obtained Present bit, whether the page to be accessed is valid in the memory of the node; and a first setting module, configured to: if the page is valid, set, in the page table corresponding to the process, the Present bit included in the page table entry of the page to be accessed, and trigger the process referencing the memory block to continually access the page to be accessed.

The first determination module includes:

a third calculation unit, configured to calculate, according to the process number of the process referencing the memory block, the sequence number, in the page table, of the page table entry of the page to be accessed, and the start address of the memory area and through the preset calculation model, a memory address for storing, in the memory area, the Present bit of the page to be accessed; and a first determination unit, configured to read the Present bit of the page to be accessed from the memory area according to the calculated memory address, if the read Present bit is set, determine that the page to be accessed is valid, and if the read Present bit is cleared, determine that the page to be accessed is invalid.

Further, the apparatus further includes:

a first clearing module, configured to: when the process referencing the memory block finishes accessing the page to be accessed, clear, in the page table corresponding to the process referencing the memory block, the Present bit included in the page table entry of the page to be accessed.

In the embodiment of the present invention, a page table corresponding to a process referencing a memory block is obtained, and a Present bit in each page table entry in the obtained page table is cleared; the process referencing the memory block is monitored in real time and timing is started; if it is detected that the process referencing the memory block generates a missing page interrupt event when accessing a page, the number of access times of the page to be accessed is increased; and a memory access model of the memory block is constructed according to the number of access times of each page in the memory block and time obtained through timing; in this way, when the memory access model of the memory block is constructed, a memory access address for each process referencing the memory block to access the memory block does not need to be recorded, so as to reduce the memory consumption and an impact on the system performance, and avoid a system breakdown.

Embodiment 7

Figure 7:
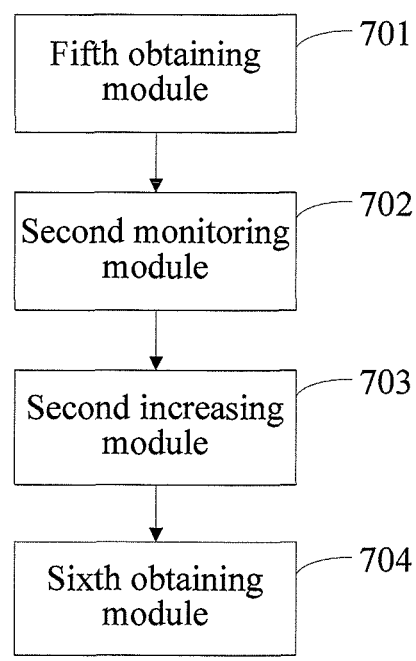
FIG. 7 is a schematic diagram of an apparatus for constructing a memory access model according to Embodiment 7 of the present invention.

As shown in FIG. 7, an embodiment of the present invention provides an apparatus for constructing a memory access model, including:

a fifth obtaining module 701, configured to obtain a page table corresponding to a target process, and clear a Present bit included in each page table entry stored in the page table, where the page table is used to store a page table entry of a page to be accessed by the target process;

a second monitoring module 702, configured to monitor the target process in real time and start timing;

a second increasing module 703, configured to: if the target process generates a missing page interrupt event when accessing a page to be accessed, increase the number of access times of the page to be accessed, where the missing page interrupt event is generated by the target process when the target process determines that a Present bit included in a page table entry of the page to be accessed is cleared, and the page table entry of the page to be accessed is obtained by the target process from the page table corresponding to the target process; and a sixth obtaining module 704, configured to construct a memory access model of the target process according to the number of access times that each page is accessed by the target process and time obtained through timing, where the memory access model at least includes the number of access times and an access frequency that each page is accessed by the target process.

The fifth obtaining module 701 includes:

a second obtaining unit, configured to obtain the page table corresponding to the target process;

a second storage unit, configured to apply for a memory area from a memory of a node, and store, in the memory area, the Present bit included in each page table entry in the page table; and a second clearing unit, configured to clear the Present bit included in each page table entry in the page table.

The second storage unit includes:

a second calculation subunit, configured to apply for a memory area from the memory of the node, and calculate, according to a process number of the target process, a sequence number, in the page table, of each page table entry in the page table, and a start address of the memory area and through a preset calculation model, a storage address for storing, in the memory area, the Present bit included in each page table entry in the page table; and a second storage subunit, configured to store, in the memory area, the Present bit included in each page table entry in the page table according to the storage address of the Present bit included in each page table entry in the page table.

The sixth obtaining module 704 is specifically configured to calculate, according to the number of access times that each page is accessed by the target process and the time obtained through timing, the access frequency that each page is accessed by the target process, so as to obtain the memory access model, where the memory access model at least includes the number of access times and the access frequency that each page is accessed by the target process.

Further, the apparatus further includes:

a seventh obtaining module, configured to obtain a local-remote access ratio and an access frequency of the target process when a time slice ends, and if the local-remote access ratio of the target process exceeds a fifth threshold and the access frequency of the target process exceeds a sixth threshold, perform an operation of obtaining the page table corresponding to the target process.

The seventh obtaining module includes:

a third obtaining unit, configured to obtain actual running time of the target process after the target process is scheduled by a processor of the node and the number of times that the target process accesses a local memory and the number of times that the target process accesses a remote-node memory in the actual running time, where the remote-node memory is a memory of another node other than the node in a computer system; and a fourth obtaining unit, configured to obtain the local-remote access ratio and the access frequency of the target process according to the actual running time and the number of times that the target process accesses the local memory and the number of times that the target process accesses the remote-node memory in the actual running time.

The third obtaining unit includes:

a loading subunit, configured to load the number of times of accessing the local memory and the number of times of accessing the remote-node memory that are included in context information of the target process into a statistical count register of the processor after the target process is scheduled by the processor of the node;

a monitoring subunit, configured to monitor the target process in real time through the processor, if it is detected that the target process accesses the local memory, increase the number of times that the target process accesses the local memory, and if it is detected that the target process accesses the remote-node memory, increase the number of times that the target process accesses the remote-node memory;

a first obtaining subunit, configured to: when the time slice ends, obtain the actual running time of the target process after the target process is scheduled; and a second obtaining subunit, configured to obtain, according to the increased number of times that the target process accesses the local memory and number of times that the target process accesses the remote-node memory, and the number of times that the target process accesses the local memory and the number of times that the target process accesses the remote-node memory that are stored in the statistical count register, the number of times that the target process accesses the local memory and the number of times that the target process accesses the remote-node memory in the actual running time.

The fourth obtaining unit includes:

a third calculation subunit, configured to calculate a ratio of the number of times that the target process accesses the local memory to the number of times that the target process accesses the remote-node memory in the actual running time, and use the ratio as the local-remote access ratio of the target process;

a fourth calculation subunit, configured to calculate the number of access times of the target process according to the number of times that the target process accesses the local memory and the number of times that the target process accesses the remote-node memory in the actual running time; and a fifth calculation subunit, configured to calculate the access frequency of the target process according to the number of access times of the target process and the actual running time.

Further, the apparatus further includes:

a second determination module, configured to obtain, from the memory area, the Present bit of the page to be accessed, and determine, according to the Present bit of the page to be accessed, whether the page to be accessed is valid in the memory of the node; and a second setting module, configured to: if the page is valid, set, in the page table corresponding to the target process, the Present bit included in the page table entry of the page to be accessed, and trigger the target process to continually access the page to be accessed.

The second determination module includes:

a fourth calculation unit, configured to calculate, according to the process number of the target process, the sequence number, in the page table, of the page table entry of the page to be accessed, and the start address of the memory area and through the preset calculation model, a memory address for storing, in the memory area, the Present bit of the page to be accessed; and a second determination unit, configured to read, from the memory area according to the calculated memory address, the Present bit of the page to be accessed, if the read Present bit is set, determine that the page to be accessed is valid, and if the read Present bit is cleared, determine that the page to be accessed is invalid.

Further, the apparatus further includes:

a second clearing module, configured to: when the target process finishes accessing the page to be accessed, clear, in the page table corresponding to the target process, the Present bit included in the page table entry of the page to be accessed.

In the embodiment of the present invention, a page table corresponding a target process is obtained, and a Present bit in each page table entry in the page table is cleared; the target process is monitored in real time and timing is started; if a missing page interrupt event that is generated by the target process when the target process accesses a page to be accessed is detected, the number of access times of the page to be accessed is increased; and a memory access model of the target process is constructed according to the number of access times that each page is accessed by the target process and time obtained through timing; in this way, when the memory access model of the target process is constructed, a memory access address for the target process to access a memory block does not need to be recorded, so as to reduce the memory consumption and an impact on the system performance, and avoid a system breakdown.

A person of ordinary skill in the art may understand that, all or a part of the steps of the foregoing embodiments may be implemented by hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments of the present invention, but are not intended to limit the present invention. Any modification, equivalent replacement, or improvement made within the spirit and principle of the present invention shall fall within the protection scope of the present invention.

What is claimed is:

1. A method for constructing a memory access model, the method comprising:
   dividing a memory of a node into multiple memory segments, and obtaining a number of access times and an access frequency that a remote node accesses a memory segment, wherein the remote node is another node other than the node in a computer systems;
   when a memory segment with the number of access times that the remote node accesses the memory segment exceeding a first threshold and an access frequency that the remote node accesses the memory segment exceeding a second threshold exists, dividing the memory segment into multiple memory blocks; and
   obtaining the number of access times and an access frequency that the remote node accesses the memory block, and when a memory block with the number of access times that the remote node accesses the memory block exceeding a third threshold and an access frequency that the remote node accesses the memory block exceeding a fourth threshold exists, obtaining a page table corresponding to a process referencing the memory block, and clearing a Present bit comprised in each page table entry stored in the page table, wherein the page table is used to store a page table entry of a page to be accessed by the process referencing the memory block;
   monitoring the process referencing the memory block in real time and starting timing;
   when the process referencing the memory block generates a missing page interrupt event when accessing a page in the memory block, increasing the number of access times of the page to be accessed, wherein the missing page interrupt event is generated when the process referencing the memory block determines that a Present bit comprised in a page table entry of the page to be accessed is cleared, and the page table entry of the page to be accessed is obtained by the process referencing the memory block from the page table corresponding to the process; and
   constructing a memory access model of the memory block according to the number of access times of each page in the memory block and time for implementing the access times, wherein the memory accessed model at least comprises the number of access times and an access frequency of each page in the memory block.

2. Tire method according to claim 1, wherein obtaining a page table corresponding to a process referencing a memory block, and clearing a Present hit comprised in each page table entry stored in the page table comprises:
   obtaining, through a reverse mapping method, the process referencing the memory block and further obtaining the page table corresponding to the process referencing the memory block;
   applying for a memory area from a memory of a node, and storing, in the memory area, the Present bit comprised in each page table entry in the page table; and
   clearing the Present bit comprised in each page table entry in the page table.

3. The method according to claim 1, wherein obtaining the number of access times and an access frequency that a remote node accesses the memory segment comprises:
   monitoring the memory segment in real time through an interconnection chip corresponding to the node and starting timing, and when it is detected that the remote node accesses the memory segment, increasing the number of access times that the remote node accesses the memory segment; and
   calculating, according to the number of access times that the remote node accesses the memory segment and time for implementing the access times, the access frequency that the remote node accesses the memory segment.

4. The method according to claim 1, wherein obtaining the number of access times and an access frequency that the remote node accesses the memory block comprises;
   monitoring the memory block in real time through an interconnection chip corresponding to the node and starting timing, and when it is detected that the remote node accesses the memory block, increasing the number of access times that the remote node accesses the memory block; and calculating, according to the number of access times that the remote node accesses the memory block and time for implementing the access times, the access frequency that the remote node accesses the memory block.

5. The method according to claim 1, wherein after increasing the number of access times of the page to be accessed, the method further comprises:
   obtaining the Present bit of the page to be accessed from the memory area, and determining, according to the obtained Present bit, whether the page to be accessed is valid in the memory of the node; and
   if the page is valid, setting, in the page table corresponding to the process, the Present bit comprised in the page table entry of the page to be accessed, and triggering the process referencing the memory block to continually access the page to be accessed.

6. A method for constructing a memory access model, the method comprising:
   obtaining a local-remote access ratio and an access frequency of a target process when a time slice ends, wherein the target process is the process needed to construct a memory access model, and when the local-remote access ratio of the target process exceeds a fifth threshold and the access frequency of the target process exceeds a sixth threshold, obtaining a page table corresponding to the target process, and clearing a Present bit comprised in each page table entry stored in the page table, wherein the page table is used to store a page table entry of a page to be accessed by the target process;
   monitoring the target process in real tam and starting timing;
   when the target process venerates a missing page interrupt event when accessing a page to be accessed, increasing the number of access times of the page to be accessed, wherein the missing page interrupt event is generated by the target process when the target process determines that a Present bit comprised in a page table entry of the page to be accessed is cleared, and the page table entry of the page to be accessed is obtained by the target process from the page table corresponding to the target process; and constructing, a memory access model of the target process according to the number of access times that each page is accessed by the target process and time for implementing the access times, wherein the memory access model at least comprises the number of access times and an access frequency that each page is accessed by the target process;

wherein obtaining the local-remote access ratio and the access frequency of tie target process comprises;

obtaining actual running time of the target process after the target process is scheduled by a processor of a node and the number of times that the target process accesses a local memory and the number of times that the target process accesses a remote-node memory in the actual running time, wherein the remote-node memory is a memory of another node other than the node in a computer system; and obtaining the local-remote access ratio and the access frequency of the target process according to the actual running time and the number of times that the target process accesses the local memory and the number of times that the target process accesses the remote-node memory in the actual running time.

7. The method according to claim 6, wherein obtaining a page table corresponding to a target process, and clearing a Present bit comprised in each page table entry stored in the page table comprises:

obtaining the page table corresponding to the target process;

applying for a memory area from a memory of a node, and storing, in the memory area, the Present bit comprised in each page table entry in the page table; and clearing the Present bit comprised in each page table entry in the page table.

8. The method according to claim 6, wherein obtaining actual running time of the target process after the target process is scheduled by a processor of the node and the number of times that the target process accesses a local memory and the number of times that the target process accesses a remote-node memory in the actual running time comprises:

loading the number of times of accessing the local memory and the number of times of accessing the remote-node memory that are comprised in context information of the target process into a statistical count register of the processor after the target process is scheduled by the processor of the node;

monitoring the t process in real time through the processor, when it is detected that the target process accesses the local memory, increasing the number of times that the target process accesses the local memory, and if it is detected that the target process accesses the remote-node memory, increasing the number of times that the target process accesses the remote-node memory;

when the time slice ends, obtaining the actual running time of the target process after the target process is scheduled; and obtaining, according to the increased number of times that the target process accesses the local memory and number of times that the target process accesses the remote-node memory, and the number of times that the target process accesses the local memory and the number of times that the target process accesses the remote-node memory that are stored in the statistical count register, the number of times that the target process accesses the local memory and the number of times that the target process accesses the remote-node memory in the actual running time.

9. The method according to claim 6, wherein obtaining the local-remote access ratio and the access frequency of the target process according to the actual running time and the number of times that the target process accesses the local memory and the number of times that the target process accesses the remote-node memory in the actual running time comprises:

calculating a ratio of the number of times that the target process accesses the local memory to the number of times that the target process accesses the remote-node memory in the actual running time, and using the ratio as the local-remote access ratio of the target process;

calculating the number of access times of the target process according to the number of times that the target process accesses the local memory and the number of times that the target process accesses the remote-node memory in the actual running time; and calculating the access frequency of the target process according to the number of access times of the target process and the actual running time.

10. The method according to claim 6, wherein after increasing the number of access times of the page to be accessed, the method further comprises:

obtaining, from the memory area, the Present bit of the page to be accessed, and determining, according to the Present bit of the page to be accessed, whether the page to be accessed is valid in the memory of the node; and if the page is valid, setting, in the page table corresponding to the target process, the Present bit comprised in the page table entry of the page to be accessed, and triggering the target process to continually access the page to be accessed.

11. A computer system, comprising one or more processors and a memory storing a software program that, when executed by the one or more processors, causes the computer system to implement the ,following steps:

dividing the memory of a node into multiple memory segments, and obtaining a number access time and an access frequency that a remote node accesses a memory segment, wherein the remote node is another node other than the node in a computer system;

when a memory segment with the number of access times that the remote node accesses the memory segment exceeding a first threshold and an access frequency that the remote node accesses the memory segment exceeding a second threshold exists, dividing the memory segment into multiple memory blocks; and obtaining the number of access time and an access frequency that the remote node accesses a memory block, and when a memory block with the number of access times that the remote node accesses the memory block exceeding a third threshold and an access frequency that the remote node accesses the memory block exceeding a fourth threshold exists, obtaining a page table corresponding to a process referencing the memory block, and clearing a Present bit comprised in each page table entry stored in the page table, wherein the page table is used to store a page table entry of a page to be accessed by the process referencing the memory block;

monitoring the process referencing the memory block in real time and starting timing;

when the process referencing the memory block generates a missing page interrupt event when accessing a page in the memory block, increasing the number of access times of the page to be accessed, wherein the missing page interrupt event is generated when the process referencing the memory block determines that a Present bit comprised in a page table entry of the page to be accessed is cleared, and the page table entry of the page to be accessed is obtained by the process referencing the memory block from the, page table corresponding to the process; and constructing a memory access model of the memory block according to the number of access times of each page in the memory block and time for implementing the access times, wherein the memory access model at least comprises the number of access time and an access frequency of each page in the memory block.

12. The computer system according to claim 11, wherein the software program, when to by the one or more processors, causes the computer system to implement the following steps:

obtaining, through a reverse mapping method, the process referencing the memory block and further obtaining the page table corresponding to the process referencing the memory block;

applying for a memory area from a memory of a node, and storing, in the memory area, the Present bit comprised in each page table entry in the page table; and clearing the Present bit comprised in each page table entry in the page table.

13. The computer system according to claim 11, wherein the software program, when executed by the one or more processors, causes the computer system to implement the following steps:

monitoring the memory segment in real time through an interconnection chip corresponding to the node and starting timing, and when it is detected that the remote node accesses the memory segment, increasing the number of access times that the remote node accesses the memory segment; and calculating, according to the number of access times that the remote node accesses the memory segment and time for implementing the access times, the access frequency that the remote node accesses the memory segment.

14. The computer system according to claim 11, wherein the software program, when executed by the one or more processors, causes the computer system to implement the following steps:

monitoring the memory block in real time through an interconnection chip corresponding to the node and starting timing, and when it is detected that the remote node accesses the memory block, increasing the number of access times that the remote node accesses the memory block; and calculating, according to the number of access times that the remote node accesses the memory block and time for implementing the access times, the access frequency that the remote node accesses the memory block.

15. the computer system according to claim 11, wherein the software program, when executed by the one or more processors, causes the computer system to implement the following steps:

obtaining the Present bit of the page to be accessed from the memory area, and determining, according to the obtained Present bit, whether the page to be accessed is valid in the memory of the node; and if the page is valid, setting, in the page table corresponding to the process, the Present bit comprised in the page table entry of the page to be accessed, and triggering the process referencing the memory block to continually access the page to be accessed.

16. A computer system, comprising one or more processors and a memory storing a software program that, when executed by the one or more processors, causes the computer system to implement the following steps:

obtaining a local-remote access ratio and an access frequency of a target process when a time slice ends, wherein the target process is the process need to construct a memory access model and when the local-remote access ratio of the target process exceeds a fifth threshold and the access frequency of the target process exceeds a sixth threshold, obtaining a page table corresponding to the target process, and clearing a Present hit comprised in each page table entry stored in the page table, wherein the page table is used to store a page table entry of a page to be accessed by the target process;

monitoring the target process in real time and starting timing;

when the target process generates a missing page Interrupt event when accessing a page to be accessed, increasing the number of access times of the page to be accessed, wherein the missing page interrupt event is generated by the target process when the target process determines that a Present bit comprised in a page table entry of the page to be accessed is cleared, and the page table entry of the page to be accessed is obtained by the target process from the page table corresponding to the target process; and constructing a memory access model of the target process according to the number of access times that each page is accessed by the target process and time for implementing the access times, wherein the memory access model at least comprises the number of access times and an access frequency that each page is accessed by the target process;

wherein obtaining the local-remote access ratio and the access frequency of the target process comprises;

obtaining actual running time of the target process after the target process is scheduled by a processor of the node and the number of times that the target process accesses a local memory and the number of times that the target process accesses a remote-node memory in the actual running time, wherein the remote-node memory is a memory of another node other than the node in a computer system; and obtaining the local-remote access ratio and the access frequency of the target process according to the actual running time and the number of times that the target process accesses the local memory and the number of times that the target process accesses the remote-node memory in the actual running time.

17. The computer system according to claim 16, wherein the software program, when executed by the one or more processors, causes the computer system to implement the following steps:

obtaining the page table corresponding to the target process;

applying for a memory area from a memory of a node, and storing, in the memory area, the Present bit comprised In each page table entry in the page table; and clearing the Present bit comprised in each page table entry in the page table.

18. The computer system according to claim 16, wherein the software program, When executed by the one or more processors, cruises the computer system to implement the following steps;
 loading the number of times of accessing the local memory and the number of times of accessing the remote-node memory that are comprised in context information of the target process into a statistical count register of the processor after the target process is scheduled by the processor of the node;
 monitoring the target process in real time through the processor, when it is detected that the target process accesses the local memory, increasing the number of times that the target process accesses the local memory, and if it is detected that the target process accesses the remote-node memory, increasing the number of times that the target process accesses the remote-node memory;
 when the time slice ends, obtaining the actual running time of the target process after the target process is scheduled; and
 obtaining, according to the increased number of times that the target process accesses the local memory and number of times that the target process accesses the remote-node memory, and the number of times that the target process accesses the local memory and the number of times that the target process accesses the remote-node memory that are stored m the statistical count register, the number of times that the target process accesses the local memory and the number of times that the target process accesses the remote-node memory ill tie actual running time.

19. The computer system according to claim 16, wherein the software program, when executed by the one or more processors, causes the computer system to implement the following steps:
 calculating a ratio of the number of times that the target process accesses the local memory to the number of times that the target process accesses t remote-node memory in the actual running time, and using the ratio as the local-remote access ratio of the target process;
 calculating the number of access times of the target process according to the number of times that the target process accesses the local memory and the number of times that the target process accesses the remote-node memory in the actual running time; and
 calculating the access frequency of the target process according to the number of access times of the target process and the actual running time.

20. The computer system according to claim 16, wherein the software program, when executed by the one or more processors, causes the computer system to implement the following steps:
 obtaining, from the memory area the Present bit of the page to be accessed, and determining, according to the Present bit of the page to be accessed, whether the page to be accessed is valid in the memory of the node; and
 if the page is valid, setting, in the page table corresponding to the target process, the Present bit comprised in the page table entry of the page to be accessed, and triggering the target process to continually access the page to be accessed.

* * * * *